United States Patent

[11] 3,585,972

[72] Inventor Heinz Lamm
 Esslingen-St. Bernhardt, Germany
[21] Appl. No. 884,123
[22] Filed Dec. 11, 1969
[45] Patented June 22, 1971
[73] Assignee Daimler-Benz Aktiengesellschaft
 Stuttgart-Unterturkheim, Germany
[32] Priority Dec. 12, 1968
[33] Germany
[31] P 18 14 234.2

[54] ROTARY PISTON INTERNAL COMBUSTION ENGINE
 12 Claims, 1 Drawing Fig.
[52] U.S. Cl. ................................................ 123/8.13
[51] Int. Cl. .................................................. F02b 53/04
[50] Field of Search ........................................ 123/8.13,
 8.09, 8.07

[56] References Cited
UNITED STATES PATENTS
3,168,077 2/1965 Froede .......................... 123/8.13
3,491,729 1/1970 Lamm .......................... 123/8.13

Primary Examiner—Clarence R. Gordon
Attorney—Craig, Antonelli, Stewart and Hill

ABSTRACT: A rotary piston internal combustion engine, especially of trochoidal construction, in which an inlet channel which is provided within a housing case, has its control aperture disposed in the contact surface of the housing case for the piston; by the use of a sleeve partially or completely lining the inlet channel a narrow annular space is formed between the outer wall of the sleeve and the wall of the inlet channel; the annular space is in communication with the inlet channel by several discharge apertures disposed essentially in the axial direction of the inlet channel in proximity of the control aperture thereof.

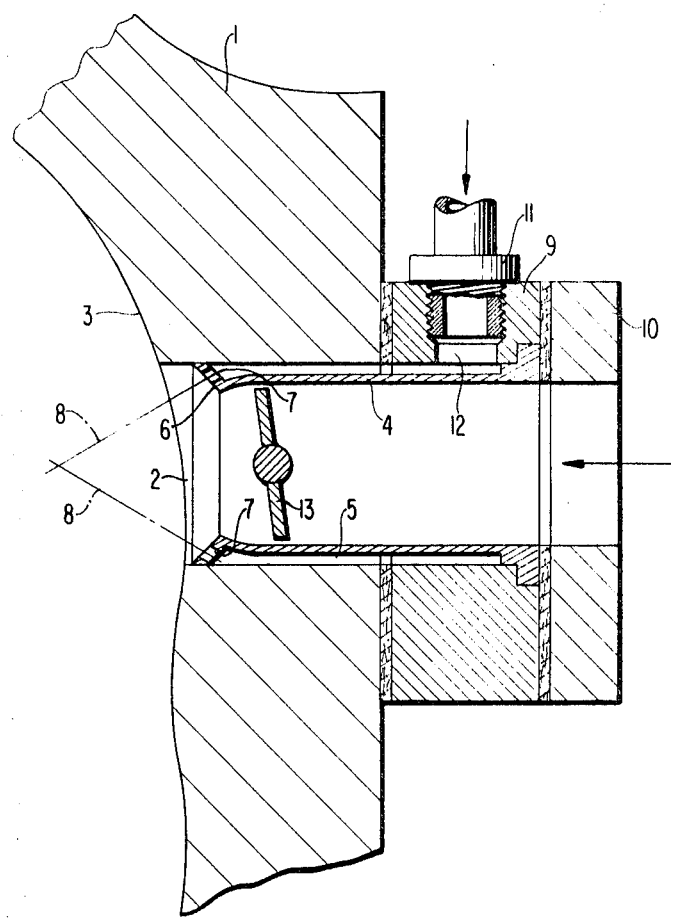

ROTARY PISTON INTERNAL COMBUSTION ENGINE

The present invention relates to a rotary piston internal combustion engine, especially of trochoidal type of construction, with an inlet channel arranged in the housing case, whose control aperture is located in the contact surface for the piston and which is provided with an aperture for the additional drawing-in or blowing-in of air, of a fuel-air mixture or possibly also of exhaust gases.

The present invention is concerned with the aim to improve, in the interest of a favorable mixture formation already proposed arrangements for the additional drawing-in or blowing-in operation in such a manner that its effects are noticeable up to the suction space of the internal combustion engine.

The underlying problems are solved in accordance with the present invention in that the aperture for the additional sucking-in or blowing-in is arranged within the area of a narrow annular space which is delimited by the outer wall of a sleeve either completely or partially lining the inlet channel and by the wall of the inlet channel and which is connected with the inlet channel in proximity of the control aperture thereof by means of several discharge apertures disposed essentially in the axial direction of the inlet channel.

By the arrangement of the sleeve one achieves with relatively simple means to shield the additional sucked-in or blown-in air or the fuel-air mixture or also the exhaust gas from the air or from the fuel-air mixture flowing principally through the inlet channel up to within proximity of the control aperture of the inlet channel so that the turbulence or eddying caused by the additional drawing-in or blowing-in becomes effective in the entire quantity in the desired manner only in the suction space. By a particular construction of the discharge apertures there further exists also the possibility in an advantageous manner to produce a large number of differing turbulence effects.

The discharge apertures may consist of bores, slots, or the like. The center longitudinal axes through the discharge apertures may thereby be so located that they intersect in a point disposed in the suction space. However, the bores, slots or the like may also be directed tangentially.

Accordingly, it is an object of the present invention to provide a rotary piston internal combustion engine of the type described above which avoids by simple means the aforementioned shortcomings and drawbacks.

Another object of the present invention resides in a rotary piston internal combustion engine, especially of trochoidal construction, which assures an adequate turbulence of the air or fuel-air mixture also in the suction space.

Still a further object of the present invention resides in a rotary piston internal combustion engine which achieves all of the aforementioned aims and objects by simple structural means that can be readily manufactured and installed.

These and other objects, features and advantages of the present invention will become more obvious from the following description when taken in connection with the accompanying drawing which shows, for purposes of illustration only, one embodiment in accordance with the present invention, and wherein:

The single FIGURE is a partial cross-sectional view transversely to the engine axis through the housing case of a rotary piston internal combustion engine of trochoidal construction in accordance with the present invention within the area of the inlet channel thereof.

Referring now to the single FIGURE of the drawing, the inlet channel 2 is arranged in the housing case 1 of the otherwise conventional internal combustion engine, not illustrated in detail herein since such details are known per se. The control aperture of the inlet channel 2 is disposed in the contact surface 3 for the piston (not shown). The sleeve 4 is arranged in the inlet channel 2 which forms with its outer wall and with the wall of the inlet channel 2 the narrow annular space 5. This annular space 5 is delimited within the area of the control aperture of the inlet channel 2 by the flange 6 abutting against the wall of the inlet channel 2; bores 7 uniformly distributed over the circumference are arranged in the flange 6 whose center longitudinal axes 8 intersect in a point outside of the inlet channel 2 and located in the suction space of the internal combustion engine. The sleeve 4 extends opposite the inflow direction within the inlet channel 2 beyond the latter up to the annular flange 9 mounted at the housing case 1, at which it is retained in the axial direction by means of a flange 10. The annular space 5 extends thereby up to the annular flange 9, in which is arranged the bore 12 in communication with the annular space 5 and provided externally of the annular flange 9 with the connecting pipe or adapter 11. The throttle valve 13 is provided on the inside of the sleeve 5.

A desired blowing-in direction can be achieved by a corresponding arrangement of the bores 7. With a tangential arrangement of the bores 7 also a spirally shaped turbulence or eddying can be produced, which continues up into the suction space.

If air or a mixture is sucked-in by way of the connecting piece 11, a separate throttle member may be arranged upstream of the connecting piece 11, which is open during idling and at smaller partial loads. With an increasing load the throttle valve 13 may be opened so that the air leaving the annular space 5 mixes well with the main-air-quantity. However, also warm air or a preheated mixture may be sucked-in by way of the connecting piece 11 in order to make available an additional air and fuel quantity after a cold starting of the internal combustion engine for the increased friction and the precipitating fuel at the cold walls. With increasing temperature of the internal combustion engine these additional quantities may be reduced or completely turned off in any conventional manner.

For the purpose of an even stronger eddying, a mixture may be transferred from the compression of the same engine and may be supplied again to the suction phase by way of the annular space 5. Since this mixture is additionally heated, the preparation effect should be particularly favorable.

For the fundamental eddying also well metered exhaust gases may be blown-in with a corresponding temperature of its own phase of the internal combustion engine. This operation can be utilized only at partial loads because the mixture quantity has to remain still ignitable.

For the purpose of producing the disturbance air which is blown-in by way of the annular space 5, also a small compressor or air-pump may be utilized.

Also two different quantities may be conducted and mixed together in the annular space 5. These different quantities are then blown-in together through the bores 7 and mix in the suction space once again as a result of the turbulence, for example, small partial-load air-quantities with hot-running mixture quantities.

Additionally, heated-up air or a heated-up mixture may be sucked-in or blown-in by way of the annular space 5. For example, the air is conducted through a double-walled exhaust pipe, is heated thereat and is then supplied to the nozzle ring at partial loads.

Possibly the supply of the air may also take place without the arrangement of a separate flange 9 directly in the housing case 1. The structural length thereby becomes shorter.

While I have shown and described only one embodiment of the present invention, it is understood that the same is not limited thereto but is susceptible of numerous changes and modifications as known to those skilled in the art and therefore I do not wish to be limited to the details shown and described herein but intend to cover all such changes and modifications as are within the scope of those skilled in the art.

What I claim is:
1. A rotary piston internal combustion engine with an inlet channel arranged in a housing case whose control aperture is disposed in the contact surface of the housing case for a piston, and which inlet channel is provided with aperture means for the additional sucking-in or blowing-in of a fluid medium, characterized in that the aperture means is arranged within the area of a narrow annular space which is delimited, on the one hand, by the outer wall of a sleeve means disposed in the inlet channel and on the other, by the wall of the inlet channel, and discharge aperture means providing a communication with the inlet channel in proximity to the control aperture thereof.

2. A rotary piston internal combustion engine according to claim 1, characterized in that said fluid medium is air.

3. A rotary piston internal combustion engine according to claim 1, characterized in that the fluid medium is a fuel-air mixture.

4. A rotary piston internal combustion engine according to claim 1, characterized in that said fluid medium is constituted by exhaust gases.

5. A rotary piston internal combustion engine according to claim 1, in which the housing case is of trochoidal construction.

6. A rotary piston internal combustion engine according to claim 1, characterized in that the sleeve means covers at least partially the inlet channel.

7. A rotary piston internal combustion engine according to claim 1, characterized in that the sleeve means lines said inlet channels substantially completely.

8. A rotary piston internal combustion engine according to claim 1, characterized in that several discharge aperture means are provided which are disposed substantially in the axial direction of the inlet channel.

9. A rotary piston internal combustion engine according to claim 8, characterized in that the discharge aperture means consist of bores.

10. A rotary piston internal combustion engine according to claim 8, characterized in that the discharge aperture means consist of slots.

11. A rotary piston internal combustion engine according to claim 8, characterized in that the center longitudinal axes through the discharge aperture means intersect substantially in a point disposed in the suction space.

12. A rotary piston internal combustion engine according to claim 8, characterized in that said discharge aperture means are directed substantially tangentially.